(12) United States Patent
Latorre Plaza et al.

(10) Patent No.: US 8,578,609 B2
(45) Date of Patent: Nov. 12, 2013

(54) MANUFACTURING PROCEDURE OF A PART MADE OUT OF A COMPOSITE MATERIAL INTRODUCING A GEOMETRIC CHANGE IN ONE OF ITS FACES

(75) Inventors: Teresa Latorre Plaza, Madrid (ES); Luis Miguel Garcia Vázquez, Madrid (ES); Manuel Recio Melero, Madrid (ES)

(73) Assignee: Airbus Operations S.L., Madrid (ES)

( * ) Notice: Subject to any disclaimer, the term of this patent is extended or adjusted under 35 U.S.C. 154(b) by 387 days.

(21) Appl. No.: 13/011,303

(22) Filed: Jan. 21, 2011

(65) Prior Publication Data

US 2012/0104168 A1     May 3, 2012

(30) Foreign Application Priority Data

Oct. 27, 2010    (ES) .................................. 201031577

(51) Int. Cl.
     *B21D 53/88*        (2006.01)
(52) U.S. Cl.
     USPC ........................... 29/897.2; 29/419.1; 264/258
(58) Field of Classification Search
     USPC ........................ 29/419.1, 897.2; 264/138, 258
     See application file for complete search history.

(56) References Cited

U.S. PATENT DOCUMENTS

| | | | | |
|---|---|---|---|---|
| 4,826,106 A * | 5/1989 | Anderson | ................... | 244/117 R |
| 6,129,311 A * | 10/2000 | Welch et al. | ............... | 244/117 R |
| 7,438,069 B2 * | 10/2008 | Simonds | ....................... | 124/23.1 |
| 8,056,859 B2 * | 11/2011 | Kunichi et al. | ............. | 244/123.1 |
| 8,287,790 B2 * | 10/2012 | Westerdahl et al. | ........... | 264/258 |
| 2004/0056152 A1 * | 3/2004 | Yamashita et al. | ............. | 244/123 |
| 2006/0083907 A1 * | 4/2006 | Bech et al. | ...................... | 428/212 |
| 2009/0084899 A1 * | 4/2009 | Kismarton et al. | ......... | 244/123.1 |
| 2010/0068450 A1 * | 3/2010 | Lloyd | .............................. | 428/99 |
| 2010/0107513 A1 | 5/2010 | Buchanan et al. | | |
| 2010/0327114 A1 * | 12/2010 | Iliopoulos et al. | ......... | 244/123.1 |
| 2011/0095129 A1 * | 4/2011 | Villares et al. | ................ | 244/119 |

FOREIGN PATENT DOCUMENTS

WO      2008/012569      1/2008

\* cited by examiner

*Primary Examiner* — David Bryant
*Assistant Examiner* — Justin Sikorski
(74) *Attorney, Agent, or Firm* — Michael Best & Friedrich LLP

(57) ABSTRACT

A manufacturing procedure of a composite material part (11), with an edge region (13) destined to be joined to another part by rivets, making a change in the geometry of said edge region (13) with respect to an initial surface (41) on the part's external face, comprising the following steps: a) providing a laying-up tool incorporating a modified surface (43) according to said change in the edge region (13) geometry; b) providing the composite material plies needed for the laying-up of the part, with the plies (51, 51', . . . , 51") destined for the edge region (13) of the part affected by the geometric modification being already cut so that they finish as they reach said modified surface (43); c) laying-up said plies over said tool and curing the resultant laminate. The invention also refers to a lower skin of an aircraft wing (11) manufactured according to said procedure.

10 Claims, 2 Drawing Sheets

MANUFACTURING PROCEDURE OF A PART MADE OUT OF A COMPOSITE MATERIAL INTRODUCING A GEOMETRIC CHANGE IN ONE OF ITS FACES

FIELD OF THE INVENTION

The present invention refers to a manufacturing procedure of a part made out of a composite material introducing a geometric modification in one of its faces and, more particularly, to a manufacturing procedure of an aircraft wing skin introducing a bevelled finish in the edge region destined to be joined to the central wing box by an intermediate plate.

BACKGROUND OF THE INVENTION

As is well known, the aeronautical industry requires structures which, on the one hand, support the loads to which they are submitted, meeting high stiffness and stress requirements, and on the other hand, are as light as possible. A consequence of this is the increased use of composite materials, especially CFRP (Carbon Fibre Reinforced Plastic), in primary structures due to the significant weight loss achieved compared with metallic materials.

Following this trend, there are known, for example, aircraft lifting surfaces which consist of two torsion boxes (on the right hand and left hand sides) joined to a central box manufactured entirely made out with CFRP panels, using as skins for said boxes individual pieces, that is to say, using four complete skins (two skins on top and two on the bottom) to make up the left hand and right hand torsion box. As it can be well understood, the integration of these kinds of parts presents different problems due to their great size and their complex geometry. One of these problems is the introduction of a bevelled finish on the bottom skin edge region of the lateral boxes to facilitate their union to the central box by an intermediate union plate.

The solution to this problem when the skins were manufactured with metallic materials consisted of a machining operation in said edge region to produce said bevelled finish, but this is not applicable to a composite material part.

The present invention is focused towards the solution of this problem.

SUMMARY OF THE INVENTION

An object of the present invention is to provide a manufacturing procedure for composite material parts which allows the introduction of geometric changes to its external face, that is to say, to the face in contact with the laying-up/curing tool without the use of machining techniques.

Another object of the present invention is to provide a manufacturing procedure of the lower skin of an aircraft lateral wing box with a bevelled finish on its external face in the edge region which is joined to the central wing box.

Another object of the present invention is to provide a lower skin of an aircraft lateral wing box with a bevelled finish on its external face in the edge region which is joined to the central wing box without the use of machining techniques.

These and other objects are achieved by a manufacturing procedure for a composite material part with an edge region destined to be joined to another part by rivets, making a change in the geometry of said edge region with respect to an initial surface on the part's external face, comprising steps of:
a) providing a laying-up tool incorporating a modified surface, according to said change in the edge region geometry; b) providing the composite material plies needed for the laying-up of the part, the plies destined for the edge region of the part affected by said geometric change being already cut so that they finish as they reach said modified surface; c) laying-up the composite material plies over said tool and curing the resultant laminate.

In a preferred embodiment, in step b), the definition of the cutting trajectory of the plies destined for the area of the part affected by said geometric change in said edge region is done by calculating the intersection of said modified surface with the hypothetic surfaces over which each ply would be placed if said geometric change were not introduced in the edge region. Hereby it is achieved a procedure which enables a laying-up of the part in the area affected by said geometric change which does not produce any impact on the internal face of the part.

In a preferred embodiment, said hypothetic surfaces, save the first, are defined as parallel surfaces to the initial surface at a distance which corresponds to the thickness of the plies laid-up previously to each one of them. Hereby it is achieved a procedure that facilitates the cutting of the plies destined to the affected region following the correct trajectory.

In another preferred embodiment, said part is the lower skin of an aircraft wing which is joined to the central wing box by a union plate and a counter plate.

In another preferred embodiment the geometric change introduced in said edge region is a bevelled finish on its external face. Hereby it is achieved a procedure that allows the manufacturing of the lower skin of the lateral wing boxes of an aircraft with a suitable edge region finish for its union to the central wing box.

In another preferred embodiment, in step a) of the procedure, said modified surface is defined so that the following conditions are met: to facilitate the alignment of the middle lines of the lower wing skin and the lower panel of the central box, respectively; to be sufficiently smooth so that the cutting angles of the plies are always more than 8° with respect to the orientation of their fibres; to provide a thickness which permits the reserve factor of each of the rivets which must be placed in said bevelled finish to remain above 1. Hereby it is achieved a procedure that permits an optimization of the direct manufacture of the lower skin of the lateral boxes of certain areas of an aircraft with a bevelled finish.

Other characteristics and advantages of the present invention will be clear from the following detailed description of embodiments illustrative of its object in relation to the attached figures.

DETAILED DESCRIPTION OF THE INVENTION

An embodiment of the present invention for a lower skin of an aircraft lateral wing box will be described.

Figure 1:
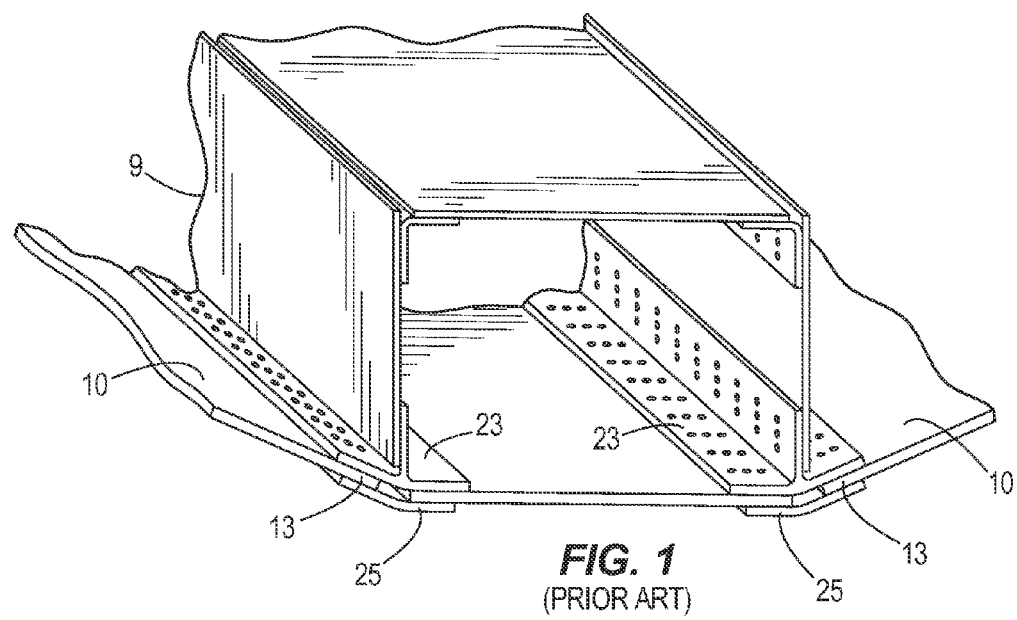
FIG. 1 is a schematic view of a known union arrangement between the lower skins of the lateral wing boxes with the central wing box of an aircraft.

FIG. 1 illustrates a known aircraft wing structure in which the lower panels 10 of the lateral boxes are joined to a central fuselage box 9 by union arrangements which comprise "T" shaped union plates 23 known as triforms and counter plates 25.

Both the lower panels 10 of the lateral boxes which comprise the lower skin 11 and the stiffening stringers 12, and the central box panels 9 are manufactured with composite materials, particularly CFRP (Carbon Fibre Reinforced Plastic). The union plates 23 and counter plates 25 are usually manufactured with metallic materials, although they could also be made out of composite materials.

Figure 2:
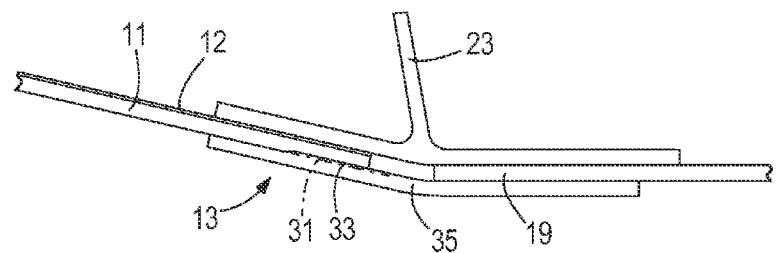
FIG. 2 is a schematic transversal view of an union arrangement between the lower skin of a lateral wing box of an aircraft, manufactured according to the procedure which is the object of the present invention, to the central box using a "T" shaped intermediate plate.
Figure 3:
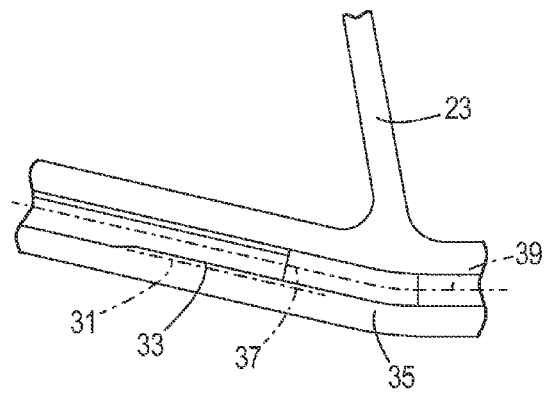
FIG. 3 is an amplified view of FIG. 2 showing the edge region of one of said lower skins in the area with a bevelled finish.

As is illustrated in FIG. 2, the area of the edge 13 of the skin 11 in which the union with the triform 23 and the counter plate 25 takes place, must have a very specific geometry so that the mechanic union with the union plate 23 and with the counter plate 25 is efficient, which means that if the assembly of the whole aircraft wing wants to be made easier the lower skin 11 must reach the final assembly line properly shaped in the edge region 13 so as to fulfil the tolerance requirements.

Among the geometric requirements to be fulfilled by the lower skin 11 lies the necessity for the edge region 13 to have a bevelled finish 33, modifying the initial finish 31 in its external face. This way several effects are achieved:

- The wing dihedral and the difference between the lower skin 11 thickness and the central box's 9 lower panel 19 thickness are corrected, maintaining the interface surface with the triform 23.
- The structural behaviour of the union is improved.
- The design of the buttstrap 35 is optimized.
- The lower skin's 11 weight is reduced.

As the lower skin 11 is manufactured with composite materials, and the external face is the one in which the bevelled finish 33 is introduced, traditional techniques used in the manufacture of parts made out of composite materials for making ramps cannot be used.

Figure 4:
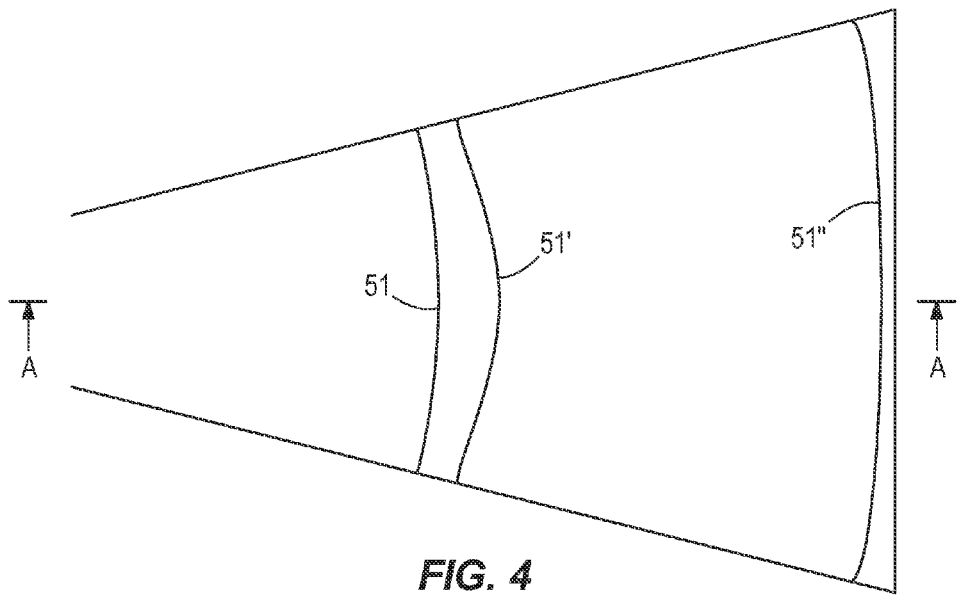
FIG. 4 is a schematic plan view of the edge region of one of said lower skins showing the ply trajectories in said bevelled finish.
Figure 5:
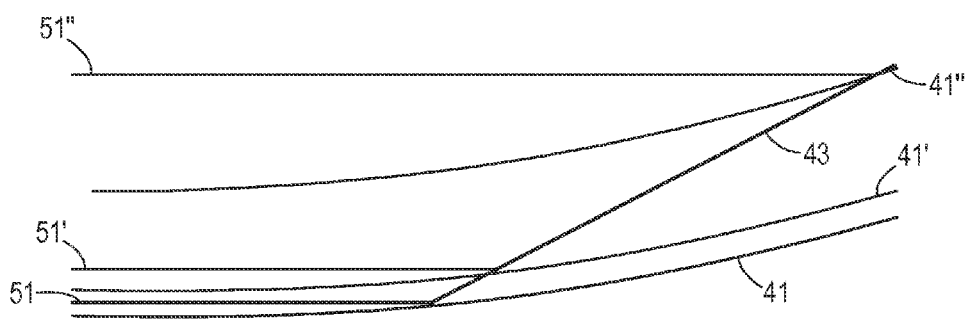
FIG. 5 is a schematic elevation view of the edge region of one of these lower skins along the A-A section marked in FIG. 4.

The procedure according to the present invention, illustrated in FIGS. 4 and 5 to introduce said bevelled finish 33 in the lower skin 11 comprises the following steps:

a) Providing a laying-up/curing tool incorporating a modified surface 43, which corresponds to said bevelled finish 33.

The modified surface 43 must satisfy the following conditions:

- To facilitate the alignment of the middle lines 37 of the lower skin 11 and the middle lines 39 of the lower panel 19 of the central box 9 along the chord of the lower skin 11.
- To be smooth enough to avoid producing cutting angles of the plies smaller than 8° with respect to the orientation of their fibres, which would be incompatible with the cutting machine's requirements.
- To provide a thickness which enables the reserve factors of each of the rivets which must be placed in the bevelled finish to be maintained above 1.

The generation of said modified surface 43 is done using a computer-aided design equipment starting from the initial surface 41 of the external face of the skin 11 in a process which can require several iterations.

b) Providing the composite material plies necessary for laying-up the part, with the plies $51, 51', \ldots, 51''$ destined to the region affected by the bevelled finish 33 already cut, so that they finish as they reach said modified surface 43.

Given the characteristics of the modified surface 43, it is necessary to cut said plies $51, 51', \ldots, 51''$ with the precise trajectory so that they adapt to it, and that is done, according to the present invention, in the following manner:

The trajectory of the first ply 51 is the intersection of the initial surface 41 with the modified surface 43.

The trajectory of the second ply $51'$ is the intersection of the surface $41'$ parallel to the initial surface at a distance which corresponds to the thickness of a ply, with the modified surface 43.

The trajectory of the ply $51''$ is the intersection of the surface $41''$ parallel to the initial surface at a distance equal to the thickness of n–1 plies, with the modified surface 43.

Once these trajectories are obtained using a computer aided design equipment, they are transmitted to the ply cutting machine when they are needed.

c) Laying-up said plies over said tool and curing the resultant laminate.

This step is carried out using conventional techniques used in the aeronautical industry.

An advantage of the present invention is that it provides a manufacturing procedure of the lower skin of an aircraft wing with a bevelled finish on its external face, maintaining its internal face parallel to the initial external face, as the precise definition of the cutting trajectories of the affected plies neutralizes the effects of the slope of the modified surface.

As the skilled man will easily understand, the present invention is applicable to the manufacture of any part which requires a similar modification, and, particularly, to the manufacture of any CFRP part whose union with other parts is effected at an angle, and in which the evolution of the neutral line must be controlled, minimizing unwanted effects such as those which arise due to a misalignment of the load.

Although the present invention has been fully described in connection with preferred embodiments, it is evident that modifications may be introduced within the scope thereof, not considering this as limited by these embodiments, but by the contents of the following claims.

The invention claimed is:

1. A manufacturing procedure of a first composite material part with an edge region destined to be joined to a second part by rivets, the first part defining a curved external face, the procedure comprising steps of:

a) providing a laying-up tool incorporating a surface according to a predetermined geometry of the edge region, wherein a middle line extending substantially along a vertical center of the surface is aligned along a chord of the first part;

b) providing composite material plies with a respective length according to a cutting trajectory, wherein the definition of the cutting trajectory of the plies destined to the area of the first part is done by calculating the intersection of said surface with hypothetical surfaces, each hypothetical surface being substantially parallel to the curved external face; and c) laying up the composite material plies over said tool and curing the resultant laminate.

2. A manufacturing procedure according to claim 1, wherein said hypothetical surfaces save the first are extending offset from the external face at a distance which corresponds to the thickness of the plies laid-up previously to each of them.

3. A manufacturing procedure according to claim 2, wherein said first part is the lower skin of an aircraft wing, wherein the second part includes a union plate and a counter plate, and wherein the second part is also joined to a lower panel of a wing central box at a position away from the first part.

4. A manufacturing procedure according to claim 1, wherein said first part is the lower skin of an aircraft wing, wherein the second part includes a union plate and a counter plate, and wherein the second part is also joined to a lower panel of a wing central box at a position away from the first part.

5. A manufacturing procedure according to claim 1, wherein said first part is the lower skin of an aircraft wing, wherein the second part includes a union plate and a counter plate, and wherein the second part is also joined to a lower panel of a wing central box at a position away from the first part.

6. A manufacturing procedure according to claim 5, wherein the predetermined geometry in said edge region is a beveled surface.

7. A manufacturing procedure according to claim 6, wherein in step a) said surface is defined so that the following conditions are satisfied:
- to facilitate the alignment of an intersection of middle lines of the lower wing skin and the lower panel of the central box along a chord of the lower wing skin, wherein the middle lines extend substantially along a vertical center of the lower wing skin and lower panel of the central box, respectively; and
- to be smooth enough to avoid producing cutting angles of the plies smaller than 8° with respect to the orientation of their fibers.

8. A lower skin of an aircraft wing characterized by the fact that it is manufactured according to the procedure of claim 5.

9. A lower skin of an aircraft wing characterized by the fact that it is manufactured according to the procedure of claim 6.

10. A lower skin of an aircraft wing characterized by the fact that it is manufactured according to the procedure of claim 7.

* * * * *